United States Patent
Wang et al.

(10) Patent No.: US 12,432,791 B2
(45) Date of Patent: Sep. 30, 2025

(54) METHOD, APPARATUS, AND DEVICE FOR DETERMINING PROTOCOL ARCHITECTURE

(71) Applicant: VIVO MOBILE COMMUNICATION CO., LTD., Guangdong (CN)

(72) Inventors: Wen Wang, Guangdong (CN); Qian Zheng, Guangdong (CN); Zhenhua Xie, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 482 days.

(21) Appl. No.: 17/955,621

(22) Filed: Sep. 29, 2022

(65) Prior Publication Data

US 2023/0021273 A1  Jan. 19, 2023

Related U.S. Application Data

(63) Continuation of application No. PCT/CN2021/085899, filed on Apr. 8, 2021.

(30) Foreign Application Priority Data

Apr. 8, 2020 (CN) .......................... 202010270669.8

(51) Int. Cl.
*H04W 76/10* (2018.01)
*H04L 69/00* (2022.01)
(Continued)

(52) U.S. Cl.
CPC ............. *H04W 76/10* (2018.02); *H04L 69/26* (2013.01); *H04W 8/005* (2013.01); *H04W 8/22* (2013.01);
(Continued)

(58) Field of Classification Search
CPC ..... H04W 76/10; H04W 8/005; H04W 80/02; H04W 80/04; H04W 76/18; H04W 76/12;
(Continued)

(56) References Cited

U.S. PATENT DOCUMENTS

2017/0094656 A1* 3/2017 Chen ..................... H04W 76/14
2018/0213577 A1 7/2018 Burbidge et al.
(Continued)

FOREIGN PATENT DOCUMENTS

CN 108029148 A 5/2018
EP 3531723 A1 8/2019
(Continued)

*Primary Examiner* — Michael K Phillips
(74) *Attorney, Agent, or Firm* — Price Heneveld LLP (57) ABSTRACT

A method, apparatus, and device for determining protocol architecture are provided. The method includes: receiving a target message from a second device, where the target message carries first information; and determining, based on the first information and second information, whether to establish a communication connection to the second device, where the first information is used to indicate architecture information of a first protocol architecture that the second device currently supports and/or prefers, and the second information is used to indicate architecture information of a second protocol architecture that a first device currently supports and/or prefers.

17 Claims, 3 Drawing Sheets

(51) Int. Cl.
*H04W 8/00* (2009.01)
*H04W 8/22* (2009.01)
*H04W 76/18* (2018.01)
*H04W 80/02* (2009.01)
*H04W 80/04* (2009.01)
*H04W 88/04* (2009.01)

(52) U.S. Cl.
CPC ............ *H04W 76/18* (2018.02); *H04W 80/02* (2013.01); *H04W 80/04* (2013.01); *H04W 88/04* (2013.01)

(58) Field of Classification Search
CPC ....... H04W 88/04; H04W 8/22; H04W 24/02; H04L 69/26
See application file for complete search history.

(56) References Cited

U.S. PATENT DOCUMENTS

| | | |
|---|---|---|
| 2019/0261450 A1 | 8/2019 | Adachi et al. |
| 2019/0350047 A1* | 11/2019 | Shan ..................... H04W 8/005 |
| 2019/0357284 A1 | 11/2019 | Xu et al. |
| 2020/0022194 A1 | 1/2020 | Wang et al. |
| 2022/0225448 A1* | 7/2022 | Li .......................... H04W 60/04 |
| 2025/0089128 A1* | 3/2025 | Hietalahti ............. H04W 40/22 |

FOREIGN PATENT DOCUMENTS

| | | |
|---|---|---|
| EP | 3618391 A1 | 3/2020 |
| JP | 2010135866 A | 6/2010 |
| WO | 2018084199 A1 | 5/2018 |
| WO | 2018090491 A1 | 5/2018 |
| WO | 2018176416 A1 | 10/2018 |
| WO | 2022027233 A1 | 2/2022 |

* cited by examiner

METHOD, APPARATUS, AND DEVICE FOR DETERMINING PROTOCOL ARCHITECTURE

CROSS-REFERENCE TO RELATED APPLICATIONS

This application is a continuation application of International Application No. PCT/CN2021/085899 filed on Apr. 8, 2021, which claims priority to Chinese Patent Application No. 202010270669.8, filed in China on Apr. 8, 2020, which are incorporated herein by reference in their entireties.

TECHNICAL FIELD

This application relates to the field of communication technologies, and in particular, to a method, apparatus, and device for determining protocol architecture.

BACKGROUND

At present, there are two protocol architectures: layer-2 based (layer-2 relay) protocol architecture and layer-3 based (layer-3 relay) protocol architecture, for relay communication in research of 5G ProSe.

In the related art, only one protocol architecture is supported for communication in a current relay communication scenario. However, as communication technologies develop, these two protocol architectures, that is, the layer-2 based and the layer-3 based protocol architectures, are highly likely to coexist in the future.

In such case, if a protocol architecture supported by a first device does not match a protocol architecture supported by a second device in a relay communication scenario, a communication connection between the first device and the second device is prone to failure.

SUMMARY

Embodiments of the present invention provide a method, apparatus, and device for determining protocol architecture.

This application is implemented as follows.

According to a first aspect, an embodiment of the present invention provides a method for determining protocol architecture, applied to a first device. The method includes: receiving a target message from a second device, where the target message carries first information; and determining, based on the first information and second information, whether to establish a communication connection to the second device, where the first information is used to indicate architecture information of a first protocol architecture that the second device currently supports and/or prefers, and the second information is used to indicate architecture information of a second protocol architecture that the first device currently supports and/or prefers.

According to a second aspect, an embodiment of the present invention provides a method for determining protocol architecture, applied to a second device. The method includes: transmitting a target message, where the target message carries first information, and the first information is used to indicate architecture information of a first protocol architecture that the second device currently supports and/or prefers.

According to a third aspect, an embodiment of the present invention provides an apparatus for determining protocol architecture, including: a receiving module, configured to receive a target message from a second device, where the target message carries first information; and a determining module, configured to determine, based on the first information received by the receiving module and second information, whether to establish a communication connection to the second device, where the first information is used to indicate architecture information of a first protocol architecture that the second device currently supports and/or prefers, and the second information is used to indicate architecture information of a second protocol architecture that a first device currently supports and/or prefers.

According to a fourth aspect, an embodiment of the present invention provides an apparatus for determining protocol architecture, including a transmitting module, configured to transmit a target message, where the target message carries first information, and the first information is used to indicate architecture information of a first protocol architecture that a second device currently supports and/or prefers.

According to a fifth aspect, an embodiment of the present invention provides a device for determining protocol architecture. The device for determining protocol architecture includes a processor, a memory, and a computer program stored in the memory and capable of running on the processor, and when the computer program is executed by the processor, the steps of the method for determining protocol architecture according to the first aspect or the second aspect are implemented.

According to a sixth aspect, an embodiment of the present invention provides a computer-readable storage medium, where the computer-readable storage medium stores a computer program, and when the computer program is executed by a processor, the steps of the method for determining protocol architecture according to the first aspect or the second aspect are implemented.

In the embodiments of the present invention, after the first device receives the target message from the second device, because the target message carries the architecture information of the first protocol architecture that the second device currently supports or prefers, the first device can determine, based on the architecture information of the second protocol architecture that the first device currently supports or prefers and the architecture information of the first protocol architecture, whether to establish a communication connection to the second device, thereby increasing a success rate of communication connection between the first device and the second device, and also improving communication efficiency.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of this application.

It should be noted that "/" in this specification represents or, for example, A/B may represent A or B; and that the term "and/or" in this specification describes only an association relationship for describing associated objects and represents that three relationships may exist, for example, A and/or B may represent the following three cases: A alone, both A and B, and B alone.

It should be noted that for ease of clear description of the technical solutions of the embodiments of this application, in the embodiments of this application, the words "first", "second", and the like are used to distinguish the same items or similar items having substantially the same functions or roles, and those skilled in the art can understand that the words "first", "second", and the like do not constitute any limitation on a quantity and an execution order. For example, first information and second information are used to distinguish different indication information, but are not used to indicate a particular order of the information.

It should be noted that in the embodiments of the present invention, terms such as "an example" or "for example" are used to represent examples, illustrations, or explanations. Any embodiment or design described by "an example" or "for example" in the embodiments of the present invention should not be construed as being more preferred or advantageous than other embodiments or designs. To be precise, the use of the term such as "an example" or "for example" is intended to present a related concept in a specific manner.

It should be noted that in the embodiments of this application, "of", "relevant" and "corresponding" can sometimes be used interchangeably. It should be noted that their meanings are the same without emphasizing their differences. In the embodiments of this application, "a plurality of" means two or more.

The technical solutions provided in the present invention can be applied to various communication systems such as a 5G communication system, a future evolved system, or a plurality of communication fusion systems. A plurality of application scenarios may be included, for example, machine to machine (M2M), D2M, macro-micro communication, enhanced mobile Internet (enhance Mobile Broadband, eMBB), ultra reliable and low latency communication (uRLLC), and massive machine type communication (mMTC). These scenarios include, but are not limited to, scenarios such as communication between terminal devices, communication between network devices, or communication between a network device and a terminal device. The embodiments of the present invention can be applied to communication between a network device and a terminal device, or communication between terminal devices, or communication between network devices in a 5G communication system.

Figure 1:
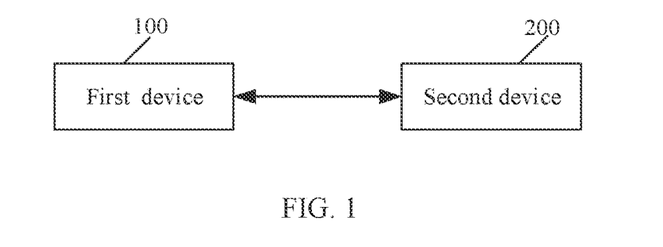
FIG. 1 is a possible schematic structural diagram of a communication system according to an embodiment of the present invention.

FIG. 1 is a possible schematic structural diagram of a communication system according to an embodiment of the present invention. As shown in FIG. 1, the communication system includes at least one first device 100 (only one is shown in FIG. 1) and at least one second device 200.

The first device may be a terminal device, network device, network element device or the like with a relay communication capability, and the second device may also be a terminal device, network device, and network element device or the like with a relay communication capability, which are not limited in the embodiments of the present invention. For example, the first device includes any one of the following: relay UE, remote UE, and roadside unit; and the second device includes any one of the following: relay UE, remote UE, and roadside unit.

For example, the network device may be a base station, a core network device, a transmission and reception point (TRP), a relay station, an access point, or the like. The network device may be a base transceiver station (BTS) in a global system for mobile communications (GSM) or code division multiple access (CDMA) network, may be an NB (NodeB) in wideband code division multiple access (WCDMA), or may be an eNB or eNodeB (evolved NodeB) in LTE. The network device may alternatively be a radio controller in a cloud radio access network (CRAN) scenario. The network device may alternatively be a network device in a 5G communication system or a network device in a future evolved network. However, the terms are not intended to limit the present invention.

For example, the terminal device may be a wireless terminal device or a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, a terminal device in a future evolved PLMN network, or the like. The wireless terminal device may communicate with one or more core networks through a radio access network (RAN). The wireless terminal device may be a mobile terminal device, such as a mobile phone (also referred to as a "cellular" phone) and a computer provided with a mobile terminal device, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communication service (PCS) phone, a cordless telephone set, a session initiation protocol (SIP) phone, a wireless local loop (WLL) station, or a personal digital assistant (PDA). The wireless terminal device may also be a mobile device, user equipment (UE), a UE terminal device, an access terminal device, a wireless communication device, a terminal device unit, a terminal device station, a mobile station, a mobile, a remote station (Remote Station), a remote terminal unit, a remote terminal, a subscriber unit, a subscriber station, a user agent, or a terminal device apparatus.

An embodiment of the present invention provides a method for determining protocol architecture, and the method for determining protocol architecture may include step 101.

Step 101: A second device transmits a target message.

The target message carries first information.

The first information is used to indicate architecture information of a first protocol architecture that the second device currently supports and/or prefers.

For example, the second device may broadcast the target message, or may directly transmit the target message to a first device, which is not limited in this embodiment of the present invention.

Figure 2:
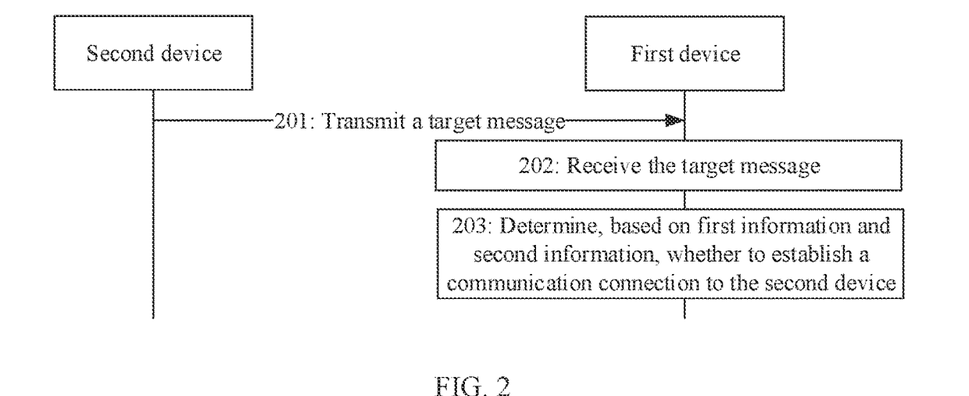
FIG. 2 is a first schematic flowchart of a method for determining protocol architecture according to an embodiment of the present invention.

Given the above content, FIG. 2 is a schematic flowchart of a method for determining protocol architecture according to an embodiment of the present invention. As shown in FIG. 2, the method for determining protocol architecture may include the following steps.

Step 201: A second device transmits a target message to a first device.

Step 202: The first device receives the target message from the second device.

Step 203: The first device determines, based on first information and second information, whether to establish a communication connection to the second device.

The second information is used to indicate architecture information of a second protocol architecture that the first device currently supports and/or prefers.

In this embodiment of the present invention, in a discovery or connection setup phase, the second device adds architecture information of a first protocol architecture that the second device currently supports or prefers to a discovery message or connection setup message, so that the first device can determine, based on the architecture information of the second protocol architecture that the first device currently supports or prefers and the architecture information of the first protocol architecture, whether to establish a communication connection to the second device.

It should be noted that the protocol architecture in this embodiment of the present invention may be a protocol stack.

Optionally, in this embodiment of the present invention, the architecture information of the first protocol architecture currently supported is used to indicate at least one of the following: layer-2 relay protocol architecture being supported for communication, and layer-3 relay protocol architecture being supported for communication; and the architecture information of the first protocol architecture currently preferred is used to indicate any one of the following: layer-2 relay protocol architecture being prioritized for communication, and layer-3 relay protocol architecture being prioritized for communication.

For example, the architecture information of the first protocol architecture is used to indicate any one of the following: the second device supporting only layer-2 relay protocol architecture for communication, the second device supporting only layer-3 relay protocol architecture for communication, the second device supporting layer-2 relay protocol architecture and layer-3 relay protocol architecture for communication, the second device preferring layer-2 relay protocol architecture for communication, and the second device preferring layer-3 relay protocol architecture for communication.

Optionally, in this embodiment of the present invention, the architecture information of the second protocol architecture currently supported is used to indicate at least one of the following: layer-2 relay protocol architecture being supported for communication, and layer-3 relay protocol architecture being supported for communication; and the architecture information of the second protocol architecture currently preferred is used to indicate any one of the following: layer-2 relay protocol architecture being prioritized for communication, and layer-3 relay protocol architecture being prioritized for communication.

For example, the architecture information of the second protocol architecture is used to indicate any one of the following: the first device supporting only layer-2 relay protocol architecture for communication, the first device supporting only layer-3 relay protocol architecture for communication, the first device supporting layer-2 relay protocol architecture and layer-3 relay protocol architecture for communication, the first device preferring layer-2 relay protocol architecture for communication, and the first device preferring layer-3 relay protocol architecture for communication.

For example, the layer-2 relay protocol architecture may be a layer-2 based protocol architecture, and the layer-3 relay protocol architecture may be a layer-3 based protocol architecture.

Optionally, in this embodiment of the present invention, the first information is pre-configured, network-configured, or determined by the second device based on a network status of the second device; and/or the second information is pre-configured, network-configured, or determined by the second device based on a network status of the first device. In an example, the first information is determined by the second device based on a network status of the second device in a case that the second device has been configured. In an example, the second information is determined by the second device according to the network status of the first device in a case that the second device has been configured.

Optionally, in this embodiment of the present invention, the target message includes a discovery message or a connection setup message. The connection setup message is used to request establishment of a communication connection between the second device and the first device.

Optionally, in this embodiment of the present invention, in a case that the target message includes a discovery message, step 203 may include the following step 203*a*.

Step 203*a*: The first device determines, through protocol architecture matching based on the first information and the second information, whether to continue to establish the communication connection to the second device.

For example, the first device determines, through protocol architecture matching on the first protocol architecture and the second protocol architecture based on the first information and the second information, whether to continue to establish the communication connection to the second device. Further, if the first protocol architecture matches the second protocol architecture, the first device continues to establish the communication connection to the second device, and if the first protocol architecture does not match the second protocol architecture, the first device discontinues to establish the communication connection to the second device.

Optionally, in this embodiment of the present invention, in a case that the target message includes a connection setup message, step 203 may include the following step 203*b*.

Step 203*b*: The first device determines, through protocol architecture matching based on the first information and the second information, whether to accept the connection setup message.

For example, the first device determines, through protocol architecture matching on the first protocol architecture and the second protocol architecture based on the first information and the second information, whether to accept the connection setup message. Further, if the first protocol architecture matches the second protocol architecture, the connection setup message is accepted, and if the first protocol architecture does not match the second protocol architecture, the connection setup message is rejected.

Further optionally, in this embodiment of the present invention, step 203b may include the following step 203b1.

Step 203b1: The first device transmits a connection setup reject message to the second device if it is determined, based on the first information and the second information, that the first protocol architecture does not match the second protocol architecture.

The connection setup reject message carries third information, where the third information is used to indicate a cause of mismatch between the first protocol architecture and the second protocol architecture.

For example, after performing protocol architecture matching on the first protocol architecture and the second protocol architecture based on the first information and the second information, if the first device determines that the first protocol architecture does not match the second protocol architecture, the first device transmits the connection setup reject message to the second device.

For example, that the first protocol architecture matches the second protocol architecture means that at least one item of the first protocol architecture is identical to at least one item of the second protocol architecture, and that the first protocol architecture does not match the second protocol architecture means that the first protocol architecture is different from the second protocol architecture.

The solutions provided in the embodiments of the present invention are detailed below using several examples.

First Possible Example

Figure 3:
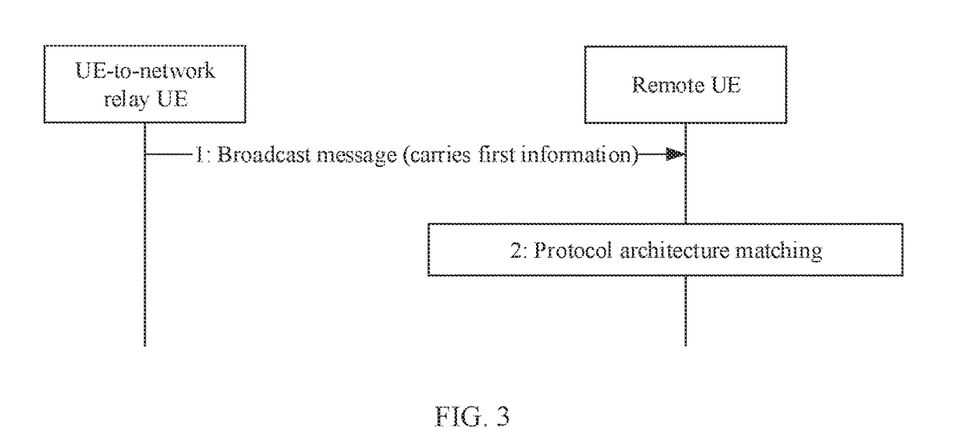
FIG. 3 is a second schematic flowchart of a method for determining protocol architecture according to an embodiment of the present invention.

For a UE-to-network relay communication scenario, the second device being UE-to-network relay UE and the first device being remote UE are used as an example. In a Mode A discovery mechanism, the solution provided in this embodiment of the present invention may include the following steps for a scenario that the UE-to-network relay UE adds first information to the discovery message (for example, Announcing message), as shown in FIG. 3.

Step 1: The UE-to-network relay UE triggers a discovery procedure, and adds first information to a broadcast message, where the first information may be used as architecture information of a first protocol architecture that UE-to-network relay UE currently supports and/or prefers.

For example, the architecture information of the first protocol architecture is used to indicate any one of the following:
  only layer-2 relay protocol architecture being supported for communication (indicating that the UE-to-network relay UE currently supports only layer-2 protocol architecture for UE-to-network relay communication);
  only layer-3 relay protocol architecture being supported for communication (indicating that the UE-to-network relay UE currently supports only layer-3 protocol architecture for UE-to-network relay communication);
  layer-2 and layer-3 relay protocol architectures being supported for communication (indicating that the UE-to-network relay UE supports layer-2 and layer-3 relay protocol architectures for UE-to-network relay communication);
  layer-2 relay protocol architecture being prioritized (indicating that the UE-to-network relay UE currently prefers layer-2 protocol architecture for UE-to-network relay communication); and
  layer-3 relay protocol architecture being prioritized (indicating that the UE-to-network relay UE currently prefers layer-3 protocol architecture for UE-to-network relay communication).

Step 2: The remote UE determines, through protocol architecture matching based on the first information and second information, whether to establish a UE-to-network relay communication connection to the UE-to-network relay UE.

For example, the second information is architecture information of a second protocol architecture that the remote UE currently supports and/or prefers.

For example, the architecture information of the second protocol architecture is used to indicate any one of the following:
  only layer-2 relay protocol architecture being supported for communication (indicating that the remote UE currently supports only layer-2 protocol architecture for UE-to-network relay communication);
  only layer-3 relay protocol architecture being supported for communication (indicating that the remote UE currently supports only layer-3 protocol architecture for UE-to-network relay communication);
  layer-2 and layer-3 relay protocol architectures being supported for communication (indicating that the remote UE supports layer-2 and layer-3 relay protocol architectures for UE-to-network relay communication);
  layer-2 relay protocol architecture being prioritized (indicating that the remote UE currently prefers layer-2 protocol architecture for UE-to-network relay communication); and
  layer-3 relay protocol architecture being prioritized (indicating that the remote UE currently prefers layer-3 protocol architecture for UE-to-network relay communication).

For example, the remote UE determines, through match on the first information and the second information, whether to select the UE-to-network relay UE. Example 1: If the first information indicates that "the UE-to-network relay UE supports only layer-2 relay protocol architecture for communication" and the second information indicates that "the remote UE supports only layer-2 relay protocol architecture for communication", the remote UE continues to determine, based on other information (for example, measurement signal quality), whether to select the UE-to-network relay UE as a UE-to-network relay. Example 2: If the first information indicates that "the UE-to-network relay UE supports only layer-2 relay protocol architecture for communication" and the second information indicates that "the remote UE supports only layer-3 relay protocol architecture for communication", the remote UE does not select the UE-to-network relay UE as a UE-to-network relay.

Second Possible Example

Figure 4:
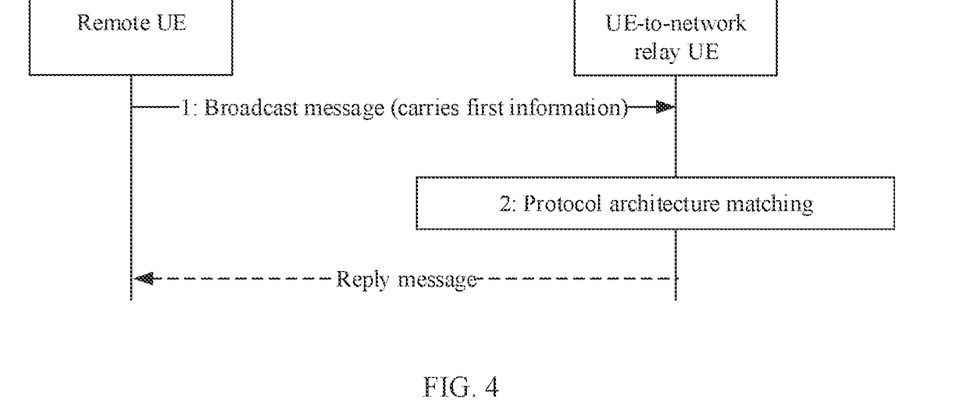
FIG. 4 is a third schematic flowchart of a method for determining protocol architecture according to an embodiment of the present invention.

For a UE-to-network relay communication scenario, the second device being remote UE and the first device being UE-to-network relay UE are used as an example. In a Mode B discovery mechanism, the solution provided in this embodiment of the present invention may include the following steps for a scenario that the remote UE adds first information to a discovery message, as shown in FIG. 4.

Step 1: The remote UE triggers a discovery procedure, and adds first information to a broadcast message (for example, Solicitation message), where the first information may be used as architecture information of a first protocol architecture that the remote UE currently supports and/or prefers.

For example, the architecture information of the first protocol architecture is used to indicate any one of the following:
- only layer-2 relay protocol architecture being supported for communication (indicating that the remote UE currently supports only layer-2 relay protocol architecture for UE-to-network relay communication);
- only layer-3 relay protocol architecture being supported for communication (indicating that the remote UE currently supports only layer-3 protocol architecture for UE-to-network relay communication);
- layer-2 and layer-3 relay protocol architectures being supported for communication (indicating that the remote UE currently supports layer-2 and layer-3 relay protocol architectures for UE-to-network relay communication);
- layer-2 relay protocol architecture being prioritized (indicating that the remote UE currently prefers layer-2 relay protocol architecture for UE-to-network relay communication); and
- layer-3 relay protocol architecture being prioritized (indicating that the remote UE currently prefers layer-3 relay protocol architecture for UE-to-network relay communication).

Step 2: The UE-to-network relay UE determines, through protocol architecture matching based on the first information and the second information, whether to respond to the discovery message from the remote UE.

For example, the second information is architecture information of a second protocol architecture that the UE-to-network relay UE currently supports and/or prefers.

For example, the architecture information of the second protocol architecture is used to indicate any one of the following:
- only layer-2 relay protocol architecture being supported for communication (indicating that the UE-to-network relay UE currently supports only layer-2 protocol architecture for UE-to-network relay communication);
- only layer-3 relay protocol architecture being supported for communication (indicating that the UE-to-network relay UE currently supports only layer-3 protocol architecture for UE-to-network relay communication);
- layer-2 and layer-3 relay protocol architectures being supported for communication (indicating that the UE-to-network relay UE supports layer-2 and layer-3 relay protocol architectures for UE-to-network relay communication);
- layer-2 relay protocol architecture being prioritized (indicating that the UE-to-network relay UE currently prefers layer-2 protocol architecture for UE-to-network relay communication); and
- layer-3 relay protocol architecture being prioritized (indicating that the UE-to-network relay UE currently prefers layer-3 protocol architecture for UE-to-network relay communication).

For example, the UE-to-network relay UE determines, through match on the architecture information of the first protocol architecture and the architecture information of the second protocol architecture, whether to select the remote UE. Example 1: If the first information indicates that "the remote UE supports only layer-2 relay protocol architecture for communication" and the second information indicates that "the UE-to-network relay UE supports only layer-2 relay protocol architecture for communication", the UE-to-network relay UE continues to determine, based on other information (for example, measurement signal quality), whether to transmit an accept message (for example, response message) to the remote UE. Example 2: If the first information indicates that "the remote UE supports only layer-2 relay protocol architecture for communication" and the second information indicates that "the UE-to-network relay UE supports only layer-3 relay protocol architecture for communication", the UE-to-network relay UE does not transmit an accept message (for example, response message) to the remote UE.

Third Possible Example

Figure 5:
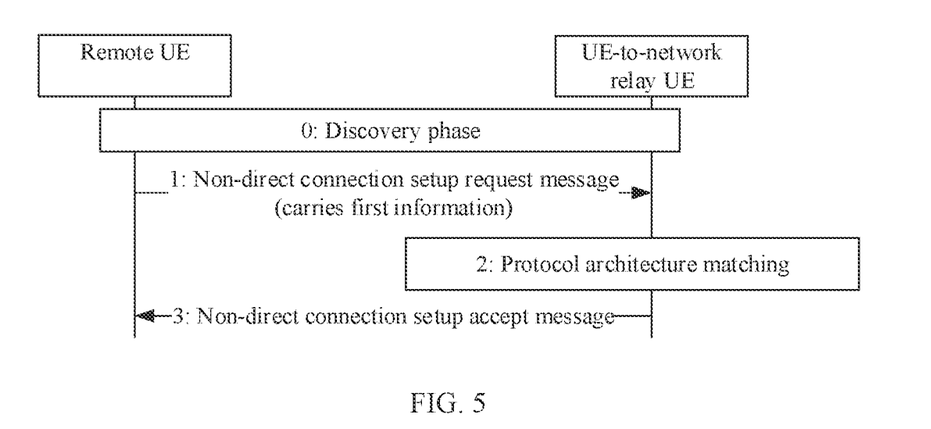
FIG. 5 is a fourth schematic flowchart of a method for determining protocol architecture according to an embodiment of the present invention.

For a UE-to-network relay communication establishment phase, the second device being remote UE and the first device being UE-to-network relay UE are used as an example. The solution provided in this embodiment of the present invention may include the following steps for a scenario that the remote UE adds first information to a non-direct connection setup request message, as shown in FIG. 5.

Step 0: After a discovery stage, the remote UE discovers and selects UE-to-network relay UE.

Step 1: The remote UE transmits, to the UE-to-network relay UE, a non-direct connection setup request message that carries first information, where the first information may be used as architecture information of a first protocol architecture that the remote UE currently supports and/or prefers.

For example, the architecture information of the first protocol architecture is used to indicate any one of the following:
- only layer-2 relay protocol architecture being supported for communication (indicating that the UE-to-network relay UE currently supports only layer-2 protocol architecture for UE-to-network relay communication);
- only layer-3 relay protocol architecture being supported for communication (indicating that the UE-to-network relay UE currently supports only layer-3 protocol architecture for UE-to-network relay communication);
- layer-2 and layer-3 relay protocol architectures being supported for communication (indicating that the UE-to-network relay UE supports layer-2 and layer-3 relay protocol architectures for UE-to-network relay communication);
- layer-2 relay protocol architecture being prioritized (indicating that the UE-to-network relay UE currently prefers layer-2 protocol architecture for UE-to-network relay communication); and
- layer-3 relay protocol architecture being prioritized (indicating that the UE-to-network relay UE currently prefers layer-3 protocol architecture for UE-to-network relay communication).

Step 2: The UE-to-network relay UE determines, through protocol architecture matching based on the first information and the second information after receiving the first information, whether to accept a non-direct connection setup request from the remote UE.

The second information is architecture information of a second protocol architecture that the UE-to-network relay UE currently supports and/or prefers.

For example, the architecture information of the second protocol architecture is used to indicate any one of the following:
- only layer-2 relay protocol architecture being supported for communication (indicating that the UE-to-network relay UE currently supports only layer-2 protocol architecture for UE-to-network relay communication);

only layer-3 relay protocol architecture being supported for communication (indicating that the UE-to-network relay UE currently supports only layer-3 protocol architecture for UE-to-network relay communication);

layer-2 and layer-3 relay protocol architectures being supported for communication (indicating that the UE-to-network relay UE supports layer-2 and layer-3 relay protocol architectures for UE-to-network relay communication);

layer-2 relay protocol architecture being prioritized (indicating that the UE-to-network relay UE currently prefers layer-2 protocol architecture for UE-to-network relay communication); and layer-3 relay protocol architecture being prioritized (indicating that the UE-to-network relay UE currently prefers layer-3 protocol architecture for UE-to-network relay communication).

For example, the UE-to-network relay UE determines, through match on the first information and the second information, whether to accept the non-direct connection setup request from the remote UE. Example 1: If the first information indicates that "the remote UE supports only layer-2 relay protocol architecture for communication" and the second information indicates that "the UE-to-network relay UE supports only layer-2 relay protocol architecture for communication", the UE-to-network relay UE accepts the non-direct connection setup request from the remote UE. Example 2: If the first information indicates that "the remote UE supports only layer-2 relay protocol architecture for communication" and the second information indicates that "the UE-to-network relay UE supports only layer-3 relay protocol architecture for communication", the UE-to-network relay UE rejects the non-direct connection setup request from the remote UE.

Step 3: If the UE-to-network relay UE accepts the non-direct connection setup request from the remote UE, the UE-to-network relay UE transmits a non-direct connection setup accept message (for example, a connection setup accept message) to the remote UE.

According to the method for determining protocol architecture provided in this embodiment of the present invention, after the first device receives the target message from the second device, because the target message carries the architecture information of the first protocol architecture that the second device currently supports or prefers, the first device can determine, based on the architecture information of the second protocol architecture that the first device currently supports or prefers and the architecture information of the first protocol architecture, whether to establish a communication connection to the second device, thereby increasing a success rate of communication connection between the first device and the second device, and also improving communication efficiency.

Figure 6:
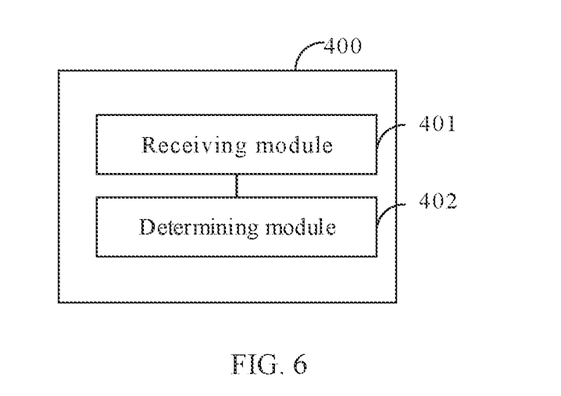
FIG. 6 is a first schematic structural diagram of an apparatus for determining protocol architecture according to an embodiment of the present invention.

FIG. 6 is a possible schematic structural diagram of an apparatus for determining protocol architecture according to an embodiment of the present invention. As shown in FIG. 6, the apparatus for determining protocol architecture 400 includes a receiving module 401 and a determining module 402. The receiving module 401 is configured to receive a target message from a second device, where the target message carries first information. The determining module 402 is configured to determine, based on the first information received by the receiving module 401 and second information, whether to establish a communication connection to the second device. The first information is used to indicate architecture information of a first protocol architecture that the second device currently supports and/or prefers, and the second information is used to indicate architecture information of a second protocol architecture that a first device currently supports and/or prefers.

Optionally, the target message includes a discovery message. The determining module 402 is specifically configured to determine, through protocol architecture matching based on the first information and the second information, whether to continue to establish the communication connection to the second device.

Optionally, the target message includes a connection setup message. The connection setup message is used to request establishment of a communication connection between the second device and the first device. The determining module 402 is specifically configured to determine, through protocol architecture matching based on the first information received by the receiving module 401 and the second information, whether to accept the connection setup message.

Optionally, the architecture information of the first protocol architecture currently supported is used to indicate at least one of the following:
  layer-2 relay protocol architecture being supported for communication, and
  layer-3 relay protocol architecture being supported for communication; and
  the architecture information of the first protocol architecture currently preferred is used to indicate any one of the following:
  layer-2 relay protocol architecture being prioritized for communication, and
  layer-3 relay protocol architecture being prioritized for communication.

Optionally, the architecture information of the second protocol architecture currently supported is used to indicate at least one of the following:
  layer-2 relay protocol architecture being supported for communication, and
  layer-3 relay protocol architecture being supported for communication; and
  the architecture information of the second protocol architecture currently preferred is used to indicate any one of the following:
  layer-2 relay protocol architecture being prioritized for communication, and
  layer-3 relay protocol architecture being prioritized for communication.

Optionally, the first information is pre-configured, network-configured, or determined by the second device based on a network status of the second device; and/or the second information is pre-configured, network-configured, or determined by the second device based on a network status of the first device.

Optionally, the determining module 402 is specifically configured to transmit a connection setup reject message to the second device if it is determined, based on the first information and the second information, that the first protocol architecture does not match the second protocol architecture. The connection setup reject message carries third information, where the third information is used to indicate a cause of mismatch between the first protocol architecture and the second protocol architecture.

Optionally, the first device includes any one of the following: relay UE, remote UE, and roadside unit; and the second device includes any one of the following: relay UE, remote UE, and roadside unit.

According to the apparatus for determining protocol architecture provided in this embodiment of the present invention, after the apparatus receives the target message from the second device, because the target message carries the architecture information of the first protocol architecture that the second device currently supports or prefers, the apparatus can determine, based on the architecture information of the second protocol architecture that the first device currently supports or prefers and the architecture information of the first protocol architecture, whether to establish a communication connection to the second device, thereby increasing a success rate of communication connection between the first device and the second device, and also improving communication efficiency.

The apparatus for determining protocol architecture provided in this embodiment of the present invention can implement the processes shown in any one of FIG. 2 to FIG. 5 in the foregoing method embodiments. To avoid repetition, details are not described herein again.

It should be noted that the apparatus for determining protocol architecture in FIG. 6 may be the first device, or a functional module and/or a functional entity in the first device. This may be specifically determined based on an actual use requirement, and is not limited in the embodiments of the present invention.

Figure 7:
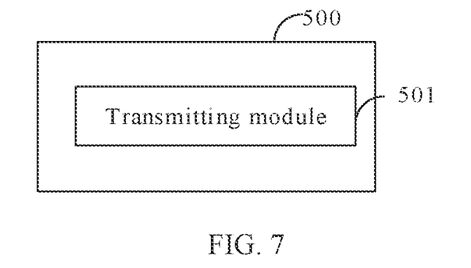
FIG. 7 is a second schematic structural diagram of an apparatus for determining protocol architecture according to an embodiment of the present invention.

FIG. 7 is a possible schematic structural diagram of an apparatus for determining protocol architecture according to an embodiment of the present invention. As shown in FIG. 7, the apparatus for determining protocol architecture 500 includes a transmitting module 501. The transmitting module 501 is configured to transmit a target message, where the target message carries first information, and the first information is used to indicate architecture information of a first protocol architecture that a second device currently supports and/or prefers.

Optionally, the target message is a discovery message or a connection setup message, and the connection setup message is used to request establishment of a communication connection between the second device and a first device.

Optionally, the architecture information of the first protocol architecture currently supported is used to indicate at least one of the following:
 layer-2 relay protocol architecture being supported for communication, and
 layer-3 relay protocol architecture being supported for communication; and
 the architecture information of the first protocol architecture currently preferred is used to indicate any one of the following:
 layer-2 relay protocol architecture being prioritized for communication, and
 layer-3 relay protocol architecture being prioritized for communication.

Optionally, the first information is pre-configured, network-configured, or determined by the second device based on a network status of the second device.

According to the apparatus for determining protocol architecture provided in this embodiment of the present invention, after the apparatus transmits the target message to the first device, because the target message carries the architecture information of the first protocol architecture that the second device currently supports or prefers, the first device can determine, based on the architecture information of the second protocol architecture that the first device currently supports or prefers and the architecture information of the first protocol architecture, whether to establish a communication connection to the second device, thereby increasing a success rate of communication connection between the first device and the second device, and also improving communication efficiency.

It should be noted that the apparatus for determining protocol architecture in FIG. 7 may be the second device, or a functional module and/or a functional entity in the second device. This may be specifically determined based on an actual use requirement, and is not limited in the embodiments of the present invention.

Figure 8:
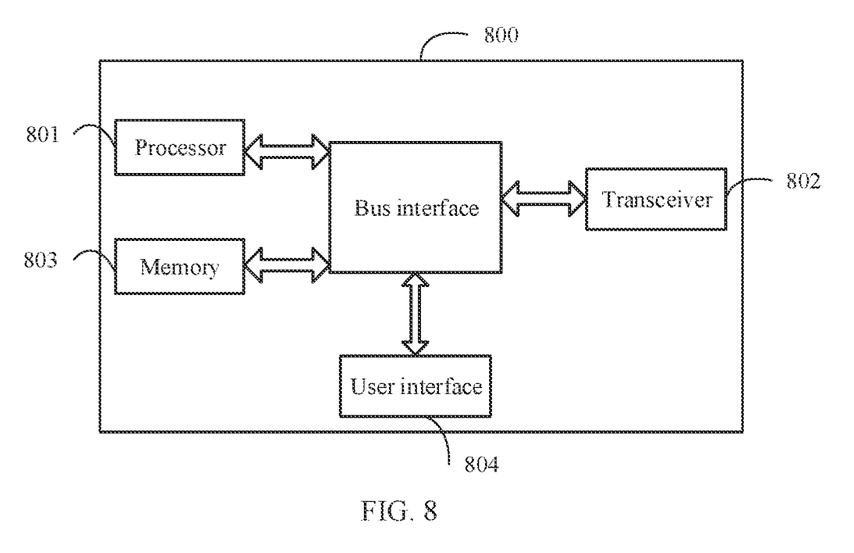
FIG. 8 is a schematic structural diagram of a device for determining protocol architecture according to an embodiment of the present invention.

FIG. 8 is a schematic structural diagram of hardware of a device for determining protocol architecture according to an embodiment of the present invention. The device for determining protocol architecture 800 includes a processor 801, a transceiver 802, a memory 803, a user interface 804, and a bus interface.

When the device for determining protocol architecture is a first device, the transceiver 802 is configured to receive a target message from a second device, where the target message carries first information; and the processor 801 is configured to determine, based on the first information received by the transceiver 802 and second information, whether to establish a communication connection to the second device. The first information is used to indicate architecture information of a first protocol architecture that the second device currently supports and/or prefers, and the second information is used to indicate architecture information of a second protocol architecture that the first device currently supports and/or prefers.

According to the first device provided in this embodiment of the present invention, after the first device receives the target message from the second device, because the target message carries the architecture information of the first protocol architecture that the second device currently supports or prefers, the first device can determine, based on the architecture information of the second protocol architecture that the first device currently supports or prefers and the architecture information of the first protocol architecture, whether to establish a communication connection to the second device, thereby increasing a success rate of communication connection between the first device and the second device, and also improving communication efficiency.

Alternatively, when the device for determining protocol architecture is a second device, the transceiver 802 is configured to transmit a target message, where the target message carries first information, and the first information is used to indicate architecture information of a first protocol architecture that the second device currently supports and/or prefers.

According to the second device provided in this embodiment of the present invention, after the second device transmits the target message to the first device, because the target message carries the architecture information of the first protocol architecture that the second device currently supports or prefers, the first device can determine, based on the architecture information of the second protocol architecture that the first device currently supports or prefers and the architecture information of the first protocol architecture, whether to establish a communication connection to the second device, thereby increasing a success rate of communication connection between the first device and the second device, and also improving communication efficiency.

In this embodiment of the present invention, in FIG. 8, a bus architecture may include any quantity of interconnected buses and bridges, and specifically connects together circuits that are of one or more processors represented by the processor 801 and of a memory represented by the memory 803. The bus architecture may further link together various other circuits, such as a peripheral device, a voltage regulator, and a power management circuit, which are well known in the art and therefore are not further described herein. A bus interface provides an interface. The transceiver 802 may be a plurality of elements, including a transmitter and a receiver, and provides units for communicating with a variety of other apparatuses over a transmission medium. For different user equipment, the user interface 804 may also be an interface that can be externally or internally connected to a required device, and the connected device includes but is not limited to a keypad, a display, a speaker, a microphone, a joystick, and the like. The processor 801 is responsible for managing the bus architecture and general processing, and the memory 803 may store data used by the processor 801 when performing an operation.

In addition, the device for determining protocol architecture 800 further includes some functional modules that are not shown, details of which are not described herein.

Optionally, an embodiment of the present invention further provides a device for determining protocol architecture. The device for determining protocol architecture is a first device, including a processor, a memory, and a computer program stored in the memory and capable of running on the processor. When the computer program is executed by the processor, the processes of the method for determining protocol architecture in the foregoing embodiments are implemented, with the same technical effects achieved. To avoid repetition, details are not described herein again.

An embodiment of the present invention further provides a computer-readable storage medium. The computer-readable storage medium stores a computer program. When the computer program is executed by a processor, the processes of the method for determining protocol architecture in the foregoing embodiments are implemented, with the same technical effects achieved. To avoid repetition, details are not described herein again. For example, the computer-readable storage medium includes a read-only memory (ROM for short), a random access memory (RAM for short), a magnetic disk, an optical disc, or the like.

It should be noted that in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present invention essentially or the part contributing to the prior art may be implemented in the form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the methods described in the embodiments of the present invention.

The foregoing describes the embodiments of the present invention with reference to the accompanying drawings. However, this application is not limited to the foregoing specific embodiments. The foregoing specific embodiments are merely illustrative rather than restrictive. Inspired by the present invention, a person of ordinary skill in the art may develop many other variations without departing from principles of this application and the protection scope of the claims, and all such variations fall within the protection scope of this application.

What is claimed is:

1. A method for determining protocol architecture, wherein the method comprises:
    receiving, by a first device, a target message from a second device, wherein the target message carries first information; and
    determining, by the first device based on the first information and second information, whether to establish a communication connection to the second device; wherein
    the first information is used to indicate architecture information of a first protocol architecture that the second device currently supports and/or prefers, and the second information is used to indicate architecture information of a second protocol architecture that the first device currently supports and/or prefers;
    wherein the architecture information of the first protocol architecture currently supported is used to indicate at least one of the following:
    layer-2 relay protocol architecture being supported for communication; or
    layer-3 relay protocol architecture being supported for communication;
    and,
    wherein the architecture information of the first protocol architecture currently preferred is used to indicate any one of the following:
    layer-2 relay protocol architecture being prioritized for communication; or
    layer-3 relay protocol architecture being prioritized for communication.

2. The method according to claim 1, wherein the target message comprises a discovery message, and the determining, by the first device based on the first information and second information, whether to establish a communication connection to the second device comprises:
    determining, by the first device through protocol architecture matching based on the first information and the second information, whether to continue to establish the communication connection to the second device.

3. The method according to claim 1, wherein the target message comprises a connection setup message, and the connection setup message is used to request establishment of a communication connection between the second device and the first device; and
    performing, by the first device, protocol architecture matching based on the first information and second information, whether to establish a communication connection to the second device comprises:
    determining, by the first device through protocol architecture matching based on the first information and the second information, whether to accept the connection setup message.

4. The method according to claim 1,
    wherein the architecture information of the second protocol architecture currently supported is used to indicate at least one of the following:

layer-2 relay protocol architecture being supported for communication;
layer-3 relay protocol architecture being supported for communication;
and,
the architecture information of the second protocol architecture currently preferred is used to indicate any one of the following:
layer-2 relay protocol architecture being prioritized for communication;
layer-3 relay protocol architecture being prioritized for communication.

5. The method according to claim 1, wherein the first information is pre-configured, network-configured, or determined by the second device based on a network status of the second device; and/or
the second information is pre-configured, network-configured, or determined by the second device based on a network status of the first device.

6. The method according to claim 3, wherein the determining, by the first device through protocol architecture matching based on the first information and the second information, whether to accept the connection setup message comprises:
transmitting, by the first device, a connection setup reject message to the second device if it is determined, based on the first information and the second information, that the first protocol architecture does not match the second protocol architecture, wherein
the connection setup reject message carries third information, wherein the third information is used to indicate a cause of mismatch between the first protocol architecture and the second protocol architecture.

7. The method according to claim 1, wherein the first device comprises any one of the following: relay UE, remote UE, and roadside unit; and the second device comprises any one of the following: relay UE, remote UE, and roadside unit.

8. A method for determining protocol architecture, wherein the method comprises:
transmitting, by a second device, a target message, wherein the target message carries first information, wherein
the first information is used to indicate architecture information of a first protocol architecture that the second device currently supports and/or prefers;
wherein the architecture information of the first protocol architecture currently supported is used to indicate at least one of the following:
layer-2 relay protocol architecture being supported for communication; or
layer-3 relay protocol architecture being supported for communication;
and,
wherein the architecture information of the first protocol architecture currently preferred is used to indicate any one of the following:
layer-2 relay protocol architecture being prioritized for communication; or
layer-3 relay protocol architecture being prioritized for communication.

9. The method according to claim 8, wherein the target message is a discovery message or a connection setup message, and the connection setup message is used to request establishment of a communication connection between the second device and a first device.

10. The method according to claim 8, wherein the first information is pre-configured, network-configured, or determined by the second device based on a network status of the second device.

11. A device for determining protocol architecture, wherein the device comprises a processor, a memory, and a computer program stored in the memory and capable of running on the processor, and when the computer program is executed by the processor, the steps of a method for determining protocol architecture according are implemented, wherein the method comprises:
receiving, by a first device, a target message from a second device, wherein the target message carries first information; and
determining, by the first device based on the first information and second information, whether to establish a communication connection to the second device; wherein
the first information is used to indicate architecture information of a first protocol architecture that the second device currently supports and/or prefers, and the second information is used to indicate architecture information of a second protocol architecture that the first device currently supports and/or prefers;
wherein the architecture information of the first protocol architecture currently supported is used to indicate at least one of the following:
layer-2 relay protocol architecture being supported for communication; or
layer-3 relay protocol architecture being supported for communication;
and,
wherein the architecture information of the first protocol architecture currently preferred is used to indicate any one of the following:
layer-2 relay protocol architecture being prioritized for communication; or
layer-3 relay protocol architecture being prioritized for communication.

12. The device for determining protocol architecture according to claim 11, wherein the target message comprises a discovery message, and the determining, by the first device based on the first information and second information, whether to establish a communication connection to the second device comprises:
determining, by the first device through protocol architecture matching based on the first information and the second information, whether to continue to establish the communication connection to the second device.

13. The device for determining protocol architecture according to claim 11, wherein the target message comprises a connection setup message, and the connection setup message is used to request establishment of a communication connection between the second device and the first device; and
performing, by the first device, protocol architecture matching based on the first information and the second information, whether to establish a communication connection to the second device comprises:
determining, by the first device through the protocol architecture matching based on the first information and the second information, whether to accept the connection setup message.

14. The device for determining protocol architecture according to claim 11, wherein the architecture information of the second protocol architecture currently supported is used to indicate at least one of the following:
layer-2 relay protocol architecture being supported for communication;
layer-3 relay protocol architecture being supported for communication;
and,
wherein the architecture information of the second protocol architecture currently preferred is used to indicate any one of the following:
layer-2 relay protocol architecture being prioritized for communication;
layer-3 relay protocol architecture being prioritized for communication.

15. The device for determining protocol architecture according to claim 11, wherein the first information is pre-configured, network-configured, or determined by the second device based on a network status of the second device; and/or
the second information is pre-configured, network-configured, or determined by the second device based on a network status of the first device.

16. The device for determining protocol architecture according to claim 13, wherein the determining, by the first device through the protocol architecture matching based on the first information and the second information, whether to accept the connection setup message comprises:
transmitting, by the first device, a connection setup reject message to the second device if it is determined, based on the first information and the second information, that the first protocol architecture does not match the second protocol architecture, wherein
the connection setup reject message carries third information, wherein the third information is used to indicate a cause of mismatch between the first protocol architecture and the second protocol architecture.

17. A device for determining protocol architecture, wherein the device comprises a processor, a memory, and a computer program stored in the memory and capable of running on the processor, and when the computer program is executed by the processor, the steps of the method for determining protocol architecture according to claim 8 are implemented.

* * * * *